United States Patent Office 3,445,623
Patented May 20, 1969

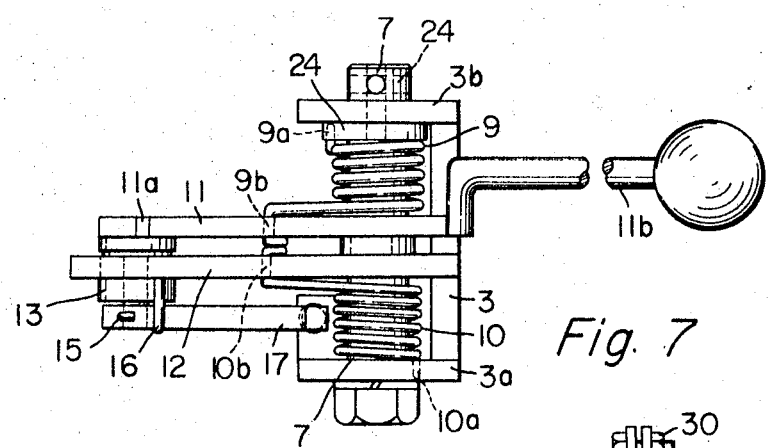
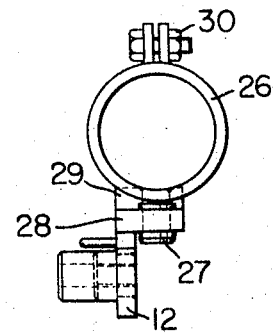
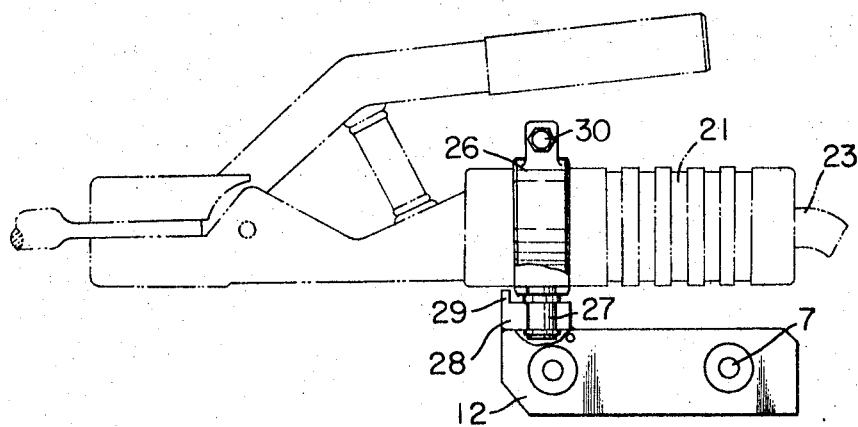

3,445,623
SEMI-AUTOMATIC WELDING MACHINE
Kuniaki Fukushima, Ichikawa, Japan, assignor to Yawata
Welding Electrode Co., Ltd., Tokyo, Japan
Filed Mar. 28, 1967, Ser. No. 626,614
Claims priority, application Japan, Mar. 30, 1966,
41/19,281
Int. Cl. B23k 9/28
U.S. Cl. 219—130                                    10 Claims

ABSTRACT OF THE DISCLOSURE

A welding machine in which the holder for the welding rod is connected with an arm mounted for pivoting movement in the direction of the workpiece during welding thereby to maintain the progressively shortening welding rod in contact with the seam being welded. A latching lever is mounted for pivoting movement adjacent the holder arm and is adapted to be selectively coupled with the latter to move as a unit therewith, the latching lever being engaged with a spring which tends to pivot it in the direction of the workpiece. The holder arm also is engaged by a spring which acts to pivot the arm away from the workpiece but which is ineffective to produce that purpose while the holder arm is coupled with the latching lever since the spring of the latter has a greater biasing force than the spring engaged with the holder arm. Coupling engagement of the latching lever and holder arm is maintained by a pawl carried on the holder arm engaging a notch on the latching lever with release of the engagement being effected by an auxiliary lever controlling the positioning of the pawl coming into engagement with an adjustment screw when the welding rod reaches a predetermined length.

Background of the invention

The present invention relates to a semi-automatic welding machine which is characterized by a mechanism with which a welding rod holder is released from the biasing effect of a spring tending to maintain the welding rod in contact with the workpiece when the rod has been consumed to a predetermined point, and automatically pivoted away from the workpiece by the biasing force of a second spring resulting in breaking of the welding arc thereby terminating the welding operation. The mechanism for producing release of the welding rod holder includes an adjustment screw the setting of which is effective to cause release at various welding rod lengths.

Conventional semi-automatic welding machines and particularly small angle welding machines generally have the drawback that the pressure with which the tip end of the welding rod is pressed against a welding line is invariable, so that the welding rod tends to be flexed when it is relatively small in diameter, while the pressure is occasionally insufficient for a welding rod having a relatively large diameter. Furthermore, it is not always possible with these machines to achieve positive breaking of the welding arc due to sputtering or other reasons, because the means for releasing the welding rod is in most cases provided in a lower portion of the welding machine. Additionally, with conventional welding machines, change in position of welds from a horizontal fillet weld to a vertical butt weld or vice versa necessitates either disassembling and rearranging the welding machine being used or providing a separate welding machine, the latter expedient being particularly undesirable because of the difficulty involved in relocating the machines. Also, with conventional welding machines, the base on which the machine is mounted generally must be flat and the welding line must be arranged parallel to the base. Still further, since conventional welding machines are not provided with means for varying the remaining welding rod to a suitable length which varies with change in position of welds, an unnecessarily long welding rod can remain at the end of welding contributing to wastage of rod. Still further, with conventional welding machines, the welding rod is generally held in a fixed position so it is impossible for the tip of the rod to follow a curved or wavy welding line, and thus deviation of the tip end from the welding line occurs during welding.

Summary of the invention

The present invention provides an improved semi-automatic welding machine in which a spring acts on a welding rod holder in such manner as to pivot it in a direction away from the welding line whereas a second spring functions to pivot the welding rod holder support arm in an opposite direction overcoming the force of the first spring during the course of the welding operation. The second spring acts on a latching lever and the first on a welding rod holder support arm the latter two elements being selectively coupled with each other by means of a pawl mechanism during the actual welding operation. When the welding rod has been consumed to a predetermined length however, the engagement of the pawl mechanism with the latching lever is released automatically uncoupling the holder arm from the latching lever, whereupon the welding rod holder arm is pivoted upwardly away from the welding line by the biasing force of the first spring with the tip end of the welding rod moving away from the welding line instantaneously thereby breaking the arc automatically and simultaneously terminates the welding operation.

According to the invention, the welding machine may be provided with a bracket on which the welding rod holder support arm is pivotally mounted and is in turn pivotally connected to a base by a single pivot pin so that the bracket is pivotable about the pivot pin and can be set in a number of positions with respect to said base, permitting left and right-hand horizontal fillet welding to be performed with the machine as well as vertically butt welding.

A further feature of the invention provides that the welding rod holder is pivotally mounted on a separate pivot pin which extends in a plane perpendicular to the pivot pin on which the welding rod holder arm is mounted to the bracket, allowing the tip end of the welding rod to be pivoted in lateral directions.

The invention accordingly comprises the features of construction, combination of elements and arrangement of parts, which will be exemplified in the construction hereinafter set forth and the scope of the invention will be indicated in the claims.

Brief description of the drawings

A fuller understanding of the nature and objects of the invention will be had from the following detailed description taken in conjunction with the accompanying drawings in which:

FIGURE 5 is a plan view of FIGURE 4.

FIGURE 6 is a front elevational view illustrating the manner in which the welding rod holder is connected to the holder arm.

FIGURE 7 is an end elevational view of FIGURE 6 as viewed from the right end of the latter.

Throughout the description like reference numerals are used to denote like parts in the drawings.

*Description of the preferred embodiments*

Figure 1:
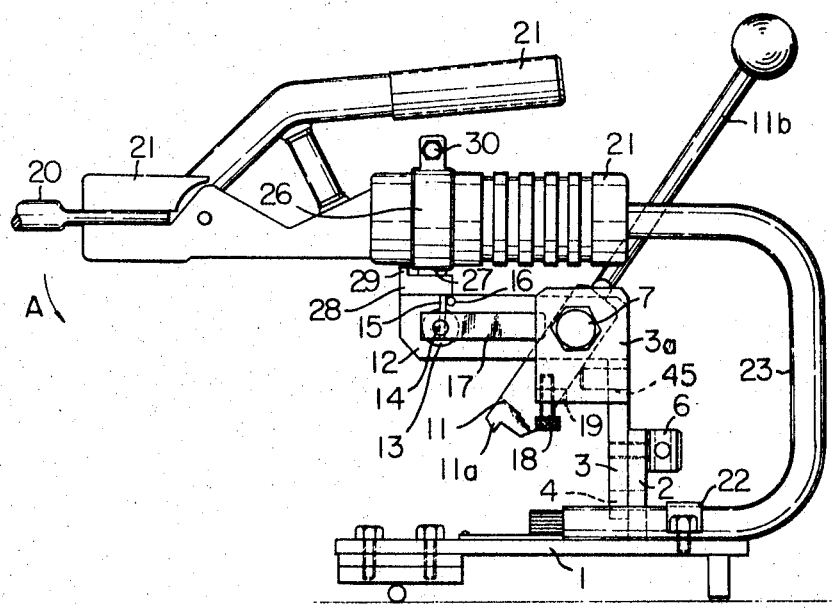
FIGURE 1 is a front elevational view of a semi-automatic welding machine constructed according to the teaching of the present invention.

The present invention provides means for controlling the movement of a welding machine to maintain the welding rod in contact with the seam being welded during the course of welding and for automatically retracting the welding rod holder to break the welding arc and remove the welding rod from the seam when the remaining length of welding rod reached a predetermined length. The welding rod is maintained in contact with the seam during welding by pivoting the rod holder in the direction of the seam and about an axis extending in a predetermined direction relative to the seam. As seen in FIGURE 1, the machine includes a holder 21 of conventional construction for holding the welding rod 20, the holder being held in a clamp ring 26 by means of which the holder is connected with structure providing for pivoting the holder about a predetermined axis, the latter being that of shaft 7 to be more fully described later in the description. Tightening of the clamp ring 26 is provided by means of bolt 30. The holder 21 is connected with power by means of cable 23, the latter being secured to the after described base 1 by means of fitting 22.

Figure 2:
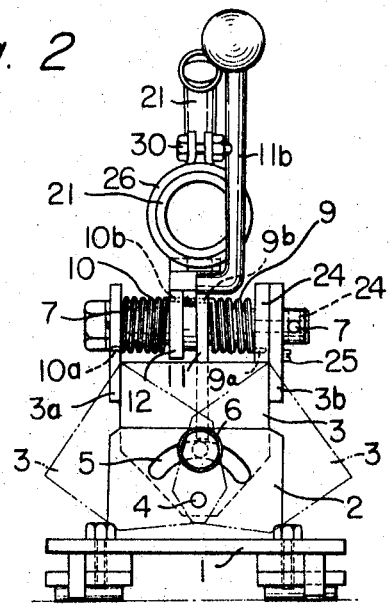
FIGURE 2 is an end elevational view of the machine shown in FIGURE 1 as viewed from the right end of FIGURE 1.
Figure 3:
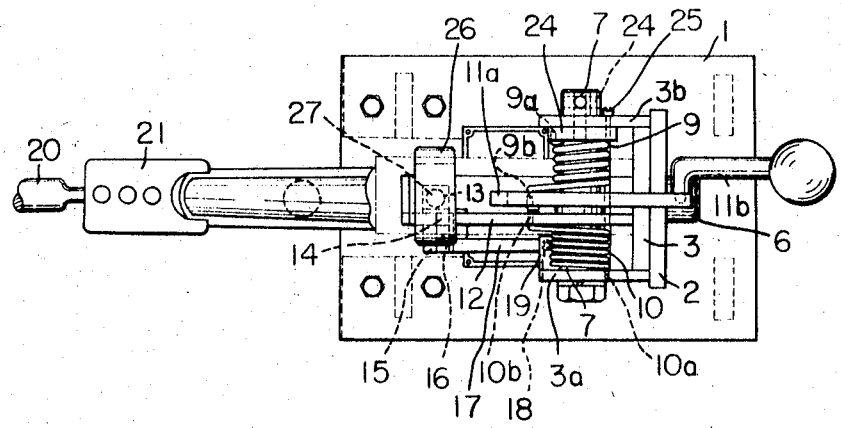
FIGURE 3 is a top plan view of FIGURE 1.

Referring now to FIGURES 1 and 2 of the drawings, the structure to which the holder is connected for pivoting movement will now be described. The welding machine includes a suitable base 1 on which is supported a vertical mounting plate 2, the latter being provided as a means for adjustably mounting a bracket 3 above the base. The lower flat plate segment of bracket 3 is pivoted to the mounting plate 2 by means of pivot 4, thus allowing swinging movement of the bracket in a plane parallel to mounting plate 2 betwen the extreme positions illustrated in long and short dashed lines in FIGURE 2. The bracket 3 can be locked at any location between the two illustrated extreme positions by tightening lock nut 6 against the mounting plate, the lock nut being threaded on a screw 6a fixed to the bracket and extending through the arcuate slot 5 formed in the mounting plate .

Bracket 3 includes upper flat side plate portions 3a and 3b which extend perpendicular to the plane of mounting plate 2 and the plane of the lower flat plate segment of the bracket, the side plate portions 3a and 3b serving as supporting structure in which is mounted shaft 7. Shaft 7 serves as a pivot on which is loosely mounted a latching lever 11 and a holder arm 12, the latter two elements being axially spaced from each other on shaft 7 by a spacer ring 40. Holder arm 12 constitutes the element to which the holder 21 is connected. Thus as seen in FIGURE 6, a ball bearing 28 is fixed to the holder arm 12 as by welding and the bearing 28 receives a pin 27 formed at the bottom of clamp ring 30. The holder thus follows the pivoting movement of the holder arm 12 when the latter is pivoted on shaft 7. Enclosing shaft 7 and associated with latching lever 11 and holder arm 12 respectively, are torsion springs 9 and 10. The arrangement of the springs 9 and 10 is such that they act on the latching lever and holder arm in a manner tending to pivot them in opposite rotative directions about shaft 7. Thus, spring 10 is achored at one end 10a to side plate 3a whereas its other end 10b is engaged at the underside of holder arm 12 and tends to rotate the holder arm in the direction of the viewer in FIGURE 5, which corresponds with a clockwise rotation as viewed in FIGURE 1. On the other hand, one end 9a of spring 9 is anchored in a stop ring 24 adjacent side plate 3b and the other end thereof 9b is engaged at the topside of latching lever 11 thereby tending to rotate the latter in a direction opposite wih that described for holder arm 12. Stop ring 24 is rotatable on shaft 7 and by suitably rotating same, the force of spring 9 can be adjusted to apply lesser or greater biasing force to latching lever 11. The adjustment means associated with stop ring 24 can take various forms as would occur to those skilled in the art, as for example, side plate 3b can be slotted to receive set screw 25 which extends into the stop ring. By tightening the set screw 25, the stop ring can be drawn up tight against and locked to side plate 3b.

Figure 4:
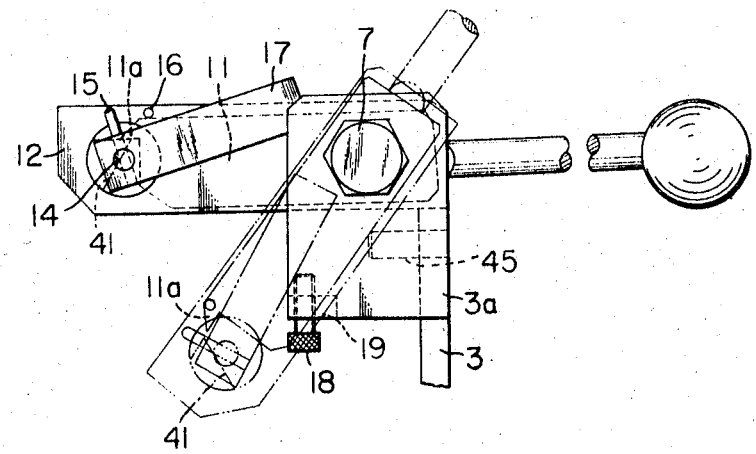
FIGURE 4 is a front view on enlarged scale of the central portion of the machine illustrated in FIGURE 1, the holder arm, latching lever and auxiliary lever being shown in full lines in their respective positions before commencement of welding and in long and short dashed

The free end of holder arm 12 is provided with a suitable bore hole 14 in which is rotatably supported a pawl assembly 13, the pawl assembly including a wedge shaped pawl 41 as best seen in FIGURE 4 for the purpose of matingly engaging a companion shaped extension 11a formed at the free end of latching lever 11. When the pawl 41 is engaged with extension 11a, the latching lever and holder arm will pivot on shaft 7 as a unit. Fixed to and rotatable with the pawl assembly 13 is an auxiliary lever 17 which as seen in FIGURE 5, extends alongside holder arm 12 being laterally spaced therefrom. Auxiliary lever 17 is provided with a stop 15 which extends substantially normal to the long axis of the auxiliary lever 17 and which with a lateral stop 16 fixed to holder arm 12 functions to limit the degree of rotation of auxiliary lever 17 relative to the holder arm thereby assuring that the pawl 41 will be maintained in suitable position to engage and/or remain engaged with the extension 11a of latching lever 11 in the manner to be described later in the course of the description.

As can be best noted in FIGURES 4 and 5, a shoulder 19 extends inwardly from bracket side plate 3a parallel with base 1 and serves as a mounting structure in which is threaded adjustment screw 18, the latter being selectively positioned to engage auxiliary lever 17, in the manner shown in FIGURE 4, to pivot same and thereby unlatch holder arm 12 to automatically discontinue the welding operation when welding rod 20 is consumed to the minimum length at which a welding circuit can be maintained or the welding operation is to be terminated. During the welding operation, the pawl 41 remains engaged with the extension 11a of latching lever 11 so that the holder arm 12 will pivot gradually downwardly in the direction of arrow A, FIGURE 1, as the welding rod 20 is consumed. At a time prior to the end of the welding operation, auxiliary lever 17 comes into abutment with adjustment screw 18 so that continued pivoting of holder arm 12 causes auxiliary lever 17 to rotate relative to the holder arm in a counterclockwise direction (FIGURE 4). The relative rotation of auxiliary lever 17 produces rotation of the pawl assembly 13 and ultimately a disengagement of pawl 41 from extension 11a of latching lever 11. The point at which disengagement occurs is a function of the setting of adjustment screw 18, the setting in turn depending upon the predetermined length of welding rod remaining at which the welding operation is to be terminated. It will be understood that the holder arm 12 pivots in the direction of arrow A (FIGURE 1) as a unit with latching lever 11 because the spring 9 exerts a greater biasing force on latching lever 11 than does spring 10 on holder arm 12. However, as soon as the pawl 41 disengages from extension 11a on latching lever 11, the holder arm 12 is released from the effect of latching lever 11 and its associated spring 9 with the effect that holder arm 12 is instantly snapped upwardly to the position shown in full lines in FIGURE 4 by the biasing force of spring 10. In this manner, the holder 21 and welding rod 20 are retracted from their welding position breaking the welding arc and terminating the welding operation. As was stated this disengagement occurs at a point which varies according to the setting of adjustment screw 18. Maximum pivoting travel of latching lever 11 is limited by means of a stop 45 (FIGURE 4). Adjustment could also be provided by providing plate 3a with a number of pin holes in which can be located a stopper pin (not shown) against which auxiliary lever 17 abuts. Alternately, a cam plate can be rotatably mounted in side plate 3a, the cam plate be rotated to various predetermined positions corresponding to various welding rod lengths at which it is desired the auxiliary lever be effective to cause disengagement of the pawl from the latching lever.

A further understanding of the welding machine of the present invention can be had from a description of the manner in which it operates. The machine is first set alongside the workpiece 50 being welded. Lock nut 6 is then loosened and bracket 3 adjusted to a position corresponding to that associated with the alignment holder 21 is to have with respect to the welding line. The lock nut 6 is then tightened. Adjustment screw 18 is then set according to the length of welding rod at which welding is to be terminated. Thereafter set screw 25 is loosened to allow stop ring 24 to be adjusted to produce a biasing force in spring 9 which is somewhat greater than that in spring 10. Set screw 25 is then tightened. A welding rod 20 is then inserted in holder 21 and the free end of the rod brought into contact with the workpiece. Lever 11b is then pivoted clockwise (FIGURE 1) to engage latching lever 11 with pawl 41. It will be understood that at this point that holder arm 12 will not be caused to pivot downwardly although spring 9 has a greater biasing force than spring 10 because the tip of the welding rod bearing against the workpiece will prevent this. It is only as the welding rod is consumed that pivoting will occur. Electric current is then supplied to holder 21 to initiate welding.

As the welding operation proceeds with the welding rod 20 being consumed, the holder arm 12 (and consequently the holder 21) is lowered and, as the length of the remaining welding rod approaches the desired or predetermined length, auxiliary lever 17 comes into abutment with and is caused to rotate by the adjusting screw 18. As a result, the pawl assembly 13 starts to rotate, with the degree of engagement between extension 11a of the latching lever 11 and pawl 41 decreasing progressively until finally disengagement occurs. With the latching lever 11 disengaged from the holder arm 12, the latter and the rod holder 21 are instantaneously pivoted upwardly by the spring force of the spring 10, and the welding circuit opened terminating the welding operation.

During the welding operation, the tip end of the welding rod 20 is pressed against the welding line with a suitable pressure as a result of the strong force of the spring 9 overcoming the force of the spring 10 with the pressure being adjustable in accordance with the diameter and length of the welding rod used. Thus there is little likelihood of the welding rod being unduly flexed even when of relatively small diameter or for the pressure to be insufficient even when the welding rod is of relatively large diameter. Moreover, since the depressing force applied to the welding rod during welding operation and the force for breaking the arc upon completion of the welding operation are provided by a combination of the two springs 9 and 10, there is no danger of malfunction occurring due to sputtering or other reasons, thus ensuring a positive welding operation. The machine of the present invention is readily adapted for use in a variety of welding positions ranging from those used for producing horizontal fillet welds to those for vertical butt welds. The welding machine also can be readily made adaptable for use where the welding line for fillet welds is curved or when the base on which the welding machine is to be mounted is not flat. A particular advantage of the machine of the present invention is that the tip end of the welding rod is not maintained in any given fixed position. Thus, it is possible to advance the tip end of the welding rod along the welding line without deviating therefrom, even when the welding line is curved or the welding machine is mounted inaccurately. The foregoing is provided by allowing the holder 21 to be swingable in a limited arc in a plane parallel to the long axis of holder arm 12. This movement is possible because pin 27 is rotatably mounted in bearing 28 for rotation about an axis perpendicular to the long axis of holder arm 12. Holder 21 only can move through a limited horizontal arc because a stop shoulder 29 is formed at the front side of bearing 28. The periphery of clamp ring 26 engage the ends of the shoulder 29 when the holder is rotated parallel to the base 1 defining the extremes of the arc of rotation.

It will thus be seen that the objects set forth above, among those made apparent from the preceding description, are efficiently attained and, since certain changes may be made in the above construction and different embodiments of the invention could be made without departing from the scope thereof, it is contended that all matter contained in the above description or shown in the accompanying drawings shall be interpreted as illustrative and not in a limiting sense.

What is claimed is:

1. In a semi-automatic welding machine which includes a holder for holding a welding rod, an arm, means for supporting said arm for pivoting movement toward and away from the welding line, said holder being connected with said arm to move as a unit therewith, a first biasing means engaging said arm and normally urging it in a direction away from the welding line, a second biasing means having a greater biasing force than said first biasing means and arranged to act in a direction opposed to the action of said first biasing means, means for selectively coupling said second biasing means with said arm whereby said holder is pivoted toward the welding line in the course of welding, maintaining the welding rod in contact with the welding line, and means operable when the welding rod has been consumed to a predetermined length for uncoupling said second biasing means from said arm whereby said first biasing means pivots said arm in a direction away from the welding line.

2. The welding machine of claim 1 wherein the means for selectively coupling said second biasing means with said arm comprises a latching lever supported for pivoting movement about the same axis about which said arm pivots, said latching lever and said arm having interengaging means effective to connect said latch lever and said arm for unitary pivoting movement about said axis, said second biasing means engaging said latching lever.

3. The welding machine of claim 2 wherein said interengaging means comprises a notch in said latching lever, and a pawl carried by said arm and engageable in said notch.

4. The welding machine of claim 3 wherein said means for uncoupling said second biasing means from said arm comprises an auxiliary lever pivoted at one end of said arm for rotation in a plane parallel to the plane in which said arm pivots, said pawl being coupled to said auxiliary lever to rotate about the same axis therewith, an abutment, and means supporting said abutment adjacent the path of movement of said arm in a position wherein said auxiliary lever engages thereagainst when said arm is pivoted in the direction of the welding line and rotated whereby said pawl is disengaged from said notch when the welding rod is consumed to a predetermined length.

5. The welding machine of claim 4 wherein said abutment comprises an adjustment screw the setting of which can be varied at different settings to effect disengagement of said pawl from said notch at correspondingly different length of the welding rod.

6. The welding machine of claim 4 further comprising a base, a bracket connected to said base, the axis about which said arm and said latching lever pivot comprising a shaft supported in said bracket, said latching lever and said arm being loosely mounted at one end on said shaft.

7. The welding machine of claim 4 wherein said first and said second biasing means comprise first and second torsion springs enclosing said shaft, said shaft spring being engaged at one end with said arm and connected at its other end with said bracket, said second spring being engaged at one end with said latching lever and connected at its other end with said bracket.

8. The welding machine of claim 7 wherein the other end of said second spring is connected to said bracket by means of an adjustment ring mounted on said shaft and adapted to be fixed to said bracket whereby the biasing force of said second spring can be varied.

9. The welding machine of claim 6 wherein said bracket is supported for swinging movement in a plane perpendicular to said base, the axis of said shaft extending in said plane.

10. The welding machine of claim 9 wherein said holder is connected with said arm by a pin supported in a bearing on said holder for rotation about an axis perpendicular to the axis of said shaft whereby said holder can be swiveled laterally of the welding line.

References Cited

UNITED STATES PATENTS 2,481,163  9/1949  Setzler.
2,890,323  6/1959  Lee.

ANTHONY BARTIS, *Primary Examiner.*

J. G. SMITH, *Assistant Examiner.*

U.S. Cl. X.R.

219—125.